April 7, 1964   J. DE FRANCISCI, JR., ETAL   3,128,159
DRYING CHAMBER CONTROL SYSTEM
Filed May 2, 1960   3 Sheets-Sheet 1

INVENTORS
JOSEPH DE FRANCISCI, JR.
LEONARD DE FRANCISCI
BY
Krazinski + Nolan
ATTORNEYS

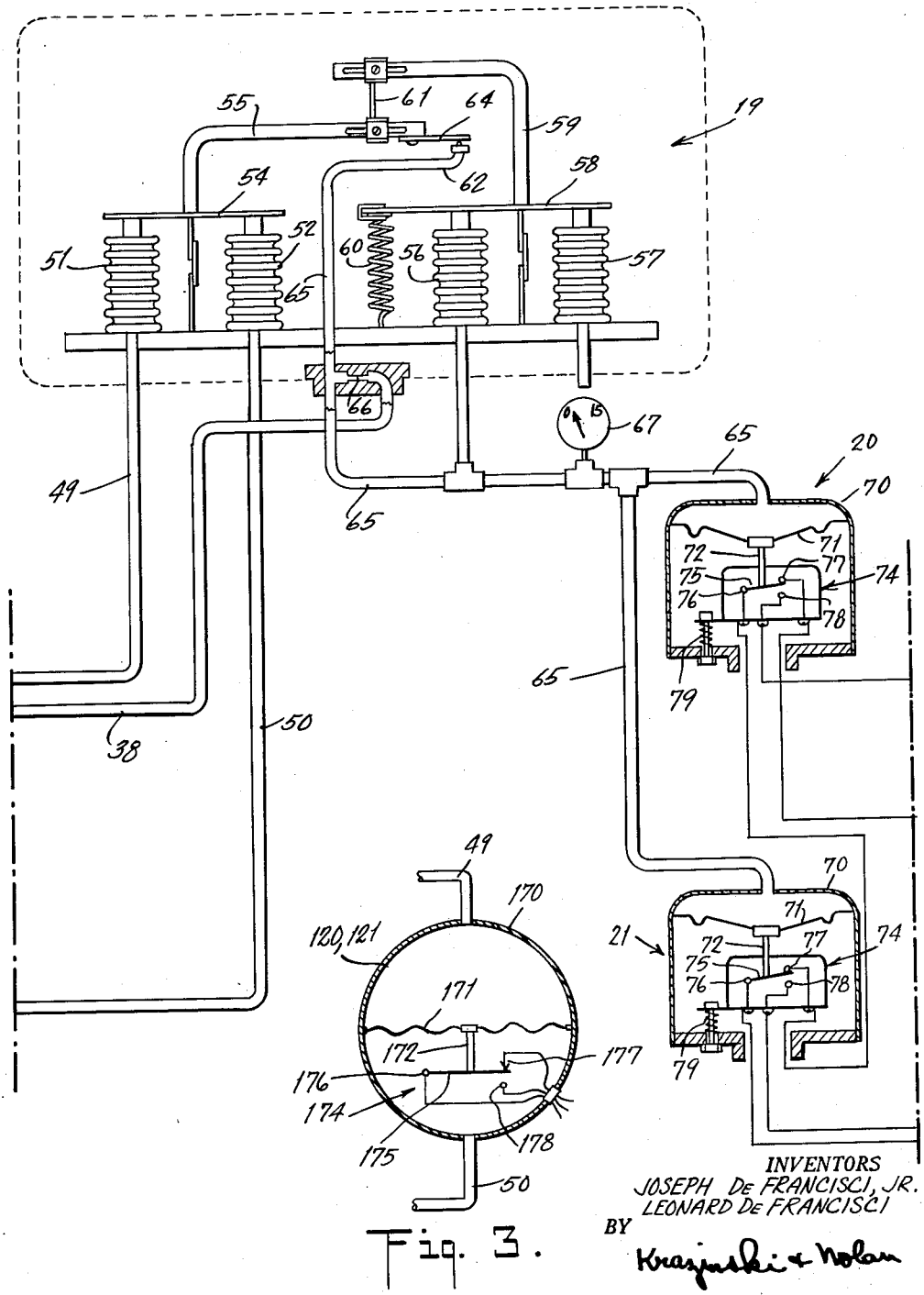

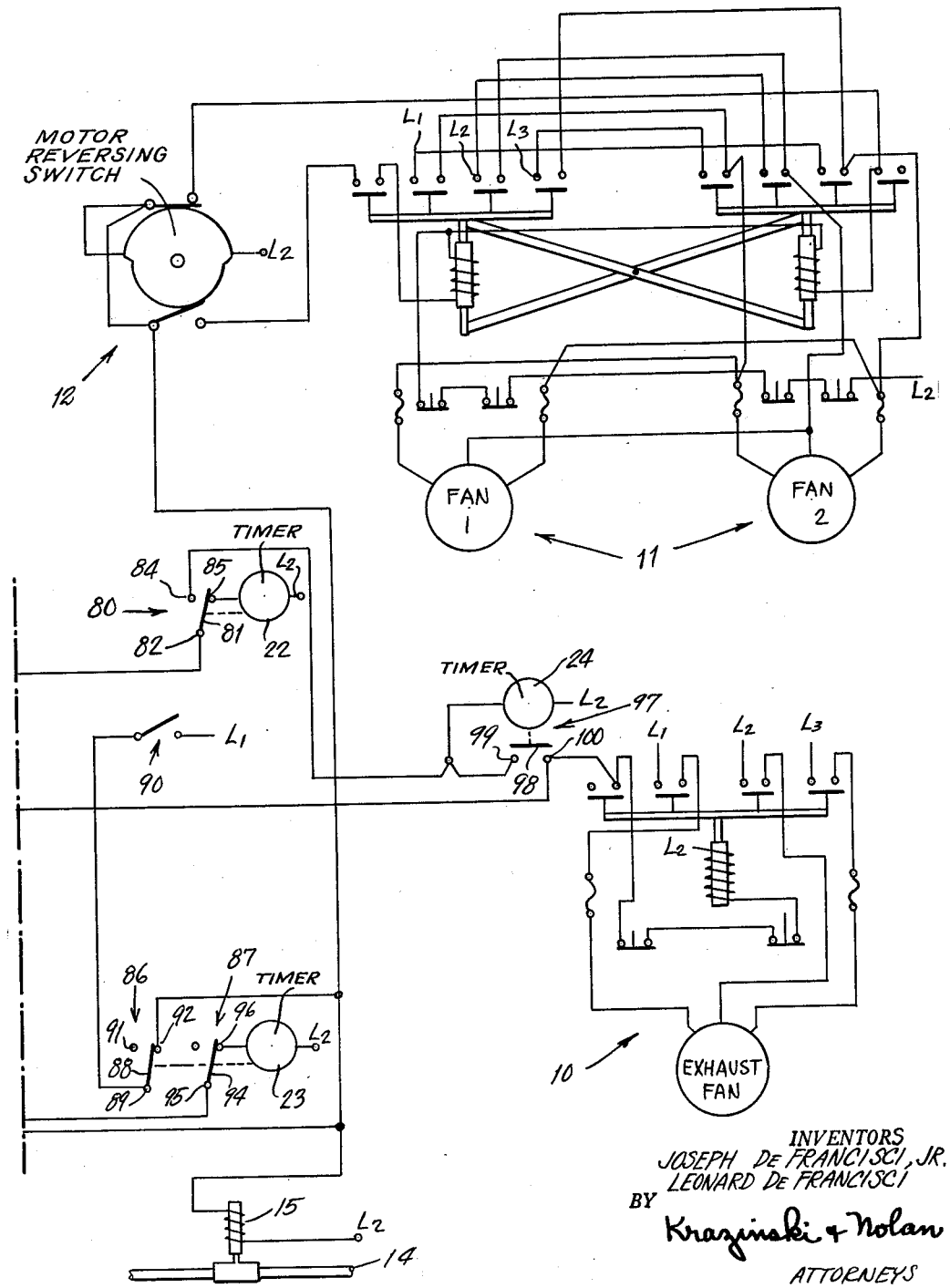

United States Patent Office 3,128,159
Patented Apr. 7, 1964

3,128,159
DRYING CHAMBER CONTROL SYSTEM
Joseph de Francisci, Jr., 197 Raymond St., Rockville Centre, N.Y., and Leonard de Francisci, 43 Trenton Ave., Long Beach, N.Y.
Filed May 2, 1960, Ser. No. 26,285
9 Claims. (Cl. 34—53)

The present invention relates to food processing apparatus of the type for drying batches of freshly made long alimentary paste products such as various sizes and/or shapes of products more generally known as macaroni, noodles and spaghetti and, more particularly, to an improved system for controlling such drying apparatus.

Products of the foregoing type contain a considerable amount of moisture after being prepared and this moisture must be substantially removed to prevent the product from developing mold during storage in packages. One of the generally accepted customs has been to place the freshly made product on sticks or hangers and maintain the same in an atmosphere of warm air for a sufficient duration to remove the moisture therefrom. This may be done by continuously passing the product through a drying chamber equipped with a conveyor system which supports the sticks or hangers, or by placing a batch of the product on stationary racks in a room or chamber which is conditioned to dry the product.

In either case of so drying the product it is necessary that the product must be dried slowly to remove the moisture uniformly throughout, as rapid drying removes moisture near the surface but not from the core, thus case hardening the outer peripheral surface. As a result, the moisture is held within the interior and the product tends to check, crack or warp, as this moisture attempts to pass through said case hardened surface, and thereby is unfit for sale. Also, it is a long process. The generally accepted optimal drying conditions call for maintaining the product in warm air at about 90° F. for about seventy hours, the exact drying time depending upon the cross-sectional area and shape of the product. Since the cost of land, buildings and taxes restrict the size of the factory which can be economically operated with a given amount of capital, the operator's competitive position is precarious unless he has an unlimited amount of capital to expand his facilities in order to suvive in the industry.

In a copending application for Letters Patent of the United States, Serial No. 635,683, filed January 23, 1957, now abandoned, and assigned to the assignee of this application, apparatus is disclosed which can batch dry the products in a rapid manner without inducing any tendency of the products to check, crack or warp. While this apparatus is fully capable of drying the products in the desired manner when supervised by a skilled operator, it has been found that the skill and judgment of even the best operator is not infallible and that reliance upon the human element introduces errors from time to time which result in improper processing, particularly where the shape and size of the products vary from batch to batch with the result that the drying technique varies from batch to batch and the judgment of the operator may be confused.

Another difficulty in the past has been that the final moisture content of the dried product could not be accurately controlled.

Accordingly, an object of the present invention is to provide a control system for drying apparatus for such products which system completely eliminates human skill and judgment and is entirely automatic in response to a predetermined moisture content set for the product, whereby the product meets the desired atmospheric condition within the drying chamber and thereby will properly process the product in the course of drying the same.

Another object is to provide such a system which automatically controls the final moisture content of the processed product.

Another object is to provide such a system which is simple and economical in construction and is reliable in operation.

A further object is to provide such a system which can be constructed of standard components and is readily incorporated in new equipment or installed in existing equipment such as disclosed in the aforementioned application.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a system for controlling the atmospheric conditions within a drying chamber which system comprises the combination of an exhaust fan for the chamber, dry and wet bulb temperature controlled means for converting dry and wet bulb temperature signals to respective pressure signals, switch means for starting and stopping the fan, and means controlled by the difference of the wet and dry bulb pressure signals to operate the switch means at desired intervals and/or duration.

In the drawings:

FIGS. 1A, 1B and 1C are diagrammatic views of the control system, with the components partly in elevation and partly in section, illustrating the pneumatic and electrical connections.

FIG. 2 is a box diagram illustrating the manner in which FIGS. 1A, 1B and 1C are arranged to provide a single complete view of the system.

FIG. 3 is a sectional view of a component which further simplifies the system.

Figure 1A:
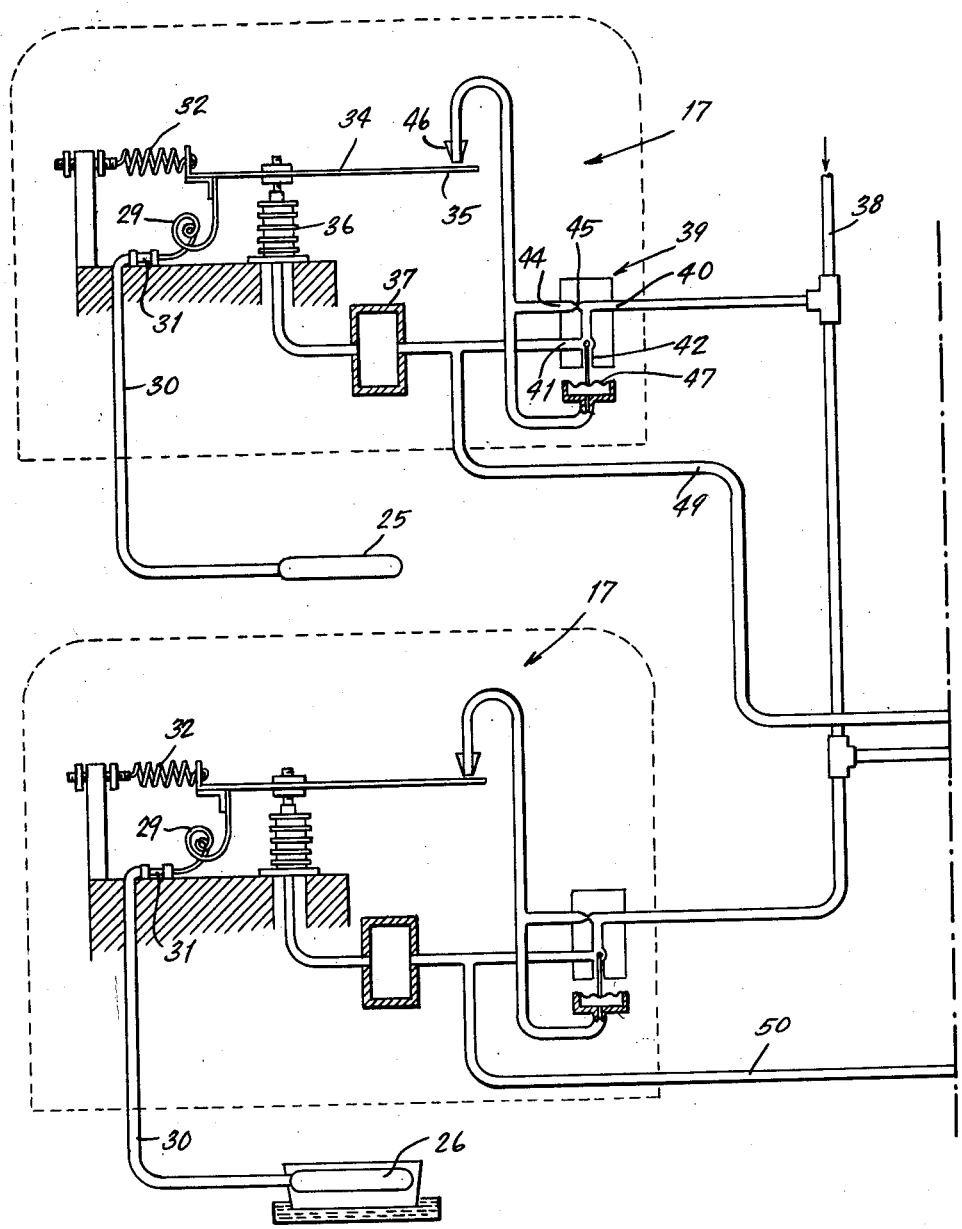
Figure 2:
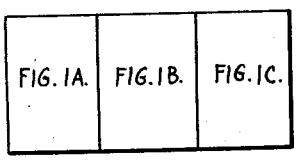

Referring now to FIGS. 1A, 1B and 1C of the drawings in detail, a control system is shown which is particularly adapted for use in connection with drying apparatus, such as disclosed in FIGS. 1 and 2 of the aforementioned application, which apparatus includes a drying chamber, air circulating fans and an exhaust fan, the fans being utilized to establish the desired atmospheric conditions within the chamber during the drying process.

The system in accordance with the present invention, as shown herein, generally comprises an exhaust fan 10, a plurality of reversible circulating fans 11 (of which only two are shown), a switch 12 for reversing the direction of rotation of the fans 11, a supply of steam 14 for heating coils (not shown) within the chamber controlled by a solenoid operated valve 15 (FIG. 1C); conventional dry and wet bulb transmitters 16 and 17, respectively, for converting a temperature signal into a pressure signal in a direct proportion (FIG. 1A); a standard computing relay 19, which subtracts the lower pressure signal from the higher pressure signal and produces an output signal which is equal to the difference of the two signals, a pair of switch operating means 20 and 21 controlled by the output signals (FIG. 1B); and timers 22, 23 and 24, the function of which will be described hereinafter (FIG. 1C).

As shown in FIG. 1A, the transmitters 16 and 17 are identical in construction except that the transmitter 16 is provided with a dry temperature sensing bulb 25 and that the transmitter 17 is provided with a wet temperature sensing bulb 26, both bulbs being located within the chamber of the drying apparatus. Each of the transmitters comprises a Bourdon spring 29 connected to the sensing bulb by a tube 30 provided with an ambient temperature compensator 31, a zero spring 32 for the Bourdon spring, a force beam 34 secured at one end to the free end of the Bourdon spring and having a baffle surface 35 at its free end, a follow-up bellows 36 secured to the force beam between the ends thereof, a capacity tank 37 in fluid flow communication with the bellows, and a pneumatic relay 39.

The relay 39 comprises an inlet 40 connected to a pipe 38 for supplying air under pressure, an outlet 41 connected to the capacity tank 37 and a second outlet 44 provided with an orifice 45 and being connected to a nozzle 46 for directing air onto the baffle surface 35 and diaphragm means 47 for controlling the needle valve 42. Output conduits 49 and 50 are connected between the tank 37 and the outlet 44 of the transmitters 16 and 17, respectively.

The pressure transmitters operate on a force balance principle, whereby any force developed by the Bourdon spring 29 is opposed by a force in the opposite direction developed by the bellows 36 which receives the output signal from the outlet 41. As the bulb senses an increase in temperature, the Bourdon spring uncoils and moves the free end of the force beam downward to increase the gap between the nozzle 46 and the baffle surface 35. This decreases the nozzle back pressure which through the action of the relay 39 causes an increase in the output signal from outlet 41. The increase in output pressure is fed through the capacity tank 37 to the follow-up bellows 36 which raises the force beam to approximately its original position. Equilibrium is established when the force produced by the follow-up bellows is proportional to the force exerted by the Bourdon spring. Thus the output pressure signal is proportional to the temperature signal of the bulb.

As shown in FIG. 1B, the computing relay 19 comprises a pair of primary bellows 51 and 52 connected by a beam 54 pivoted at its midpoint having a lever 55 mounted thereon, a pair of secondary bellows 56 and 57 connected by a beam 58 pivoted at its midpoint having a lever 59 mounted thereon, a bias spring 60 for the beam 58, adjustable linkage 61 interconnecting the levers 55 and 59, and a nozzle 62 for directing air against a baffle plate 64 at the free end of the lever 55.

The bellows 51 and 52 are respectively connected to the outputs 49 and 50 of the transmitters 16 and 17, the bellows 56 and the nozzle 62 are connected to an output conduit 65, the bellows 57 is vented to atmosphere, and the air supply pipe 38 is connected to the conduit 65 between the bellows 56 and the nozzle 62 through an orifice 66.

The computing relay 19 output is a function of the nozzle-baffle plate relationship. When equal pressures are supplied to the bellows 51 and 52, there will be no resultant torque about the pivot point of the beam 54; but if the pressures are unequal, there will be a resultant torque which is proportional to the pressure differential and the bellows 51 and 52 will move the baffle plate 64 and produce a change in the nozzle 62 back pressure. In this manner, the torques developed in the two pairs of opposed bellows units are balanced; and a change in balance increases the effective length of one lever and decreases the effective length of the other lever, whereby the baffle plate-nozzle relationship changes and the back pressures developed by this relationship are transmitted as the relay output and are piped into the feed back bellows 56. The relay output can be read in a pressure gauge 67 in the conduit 65.

As shown in FIG. 1B, the switch operating means 20 and 21 are identical in construction except that they are operable at different pressures. Each of these comprises a casing 70 having a diaphragm 71 therein provided with a stem 72, an opening at the top connected to the relay output conduit 65 and an opening to atmosphere at the bottom; a single pole double throw switch 74 including an arm 75 operated by the diaphragm stem 72 and connected to a terminal 76 and to either of contacts 77, 78; and a spring 79 for biasing the switch against the diaphragm 71.

Each of the timers 22 and 23, shown in FIG. 1C, is of standard type powered by an electric motor (not shown). The timer 24 also is of standard type powered by an electric motor (not shown) and is known as a percentage timer which can be set for a desired time interval and provides for a percentage of On and Off time during the set time interval. For example, if the set time is ten minutes and 50% On time is desired, this timer functions in the alternate On and Off relationship, so that the total On time during the set time is five minutes. The timers 22, 23 and 24 are set manually with the timer 24 being set for a longer period of time than required for completion of the process.

The timer 22 controls a single pole double throw switch 80 including a switch arm 81 connected to a terminal 82, and adapted to connect either to a contact 84 or to a contact 85, the latter of which is connected to an input side of the timer motor (not shown). The other side of the timer motor is connected to one side of a power line $L_2$.

The timer 23 controls a pair of mechanically interconnected single pole double throw switches 86 and 87. The switch 86 includes an arm 88 connected to a terminal 89 in electrical connection with the other side of a power line $L_1$ through a main switch 90, and to either of contacts 91 and 92. The switch 87 includes an arm 94 connected to a terminal 95 and to a contact 96 connected to an input side of the timer motor. The other side of the timer motor is connected to the power line $L_2$.

The timer 24 controls a switch 97 including an arm 98 for bridging across contacts 99 and 100, the latter contact 100 being adapted to control the exhaust fan 10.

The switch operating units and the timers are connected to provide control of the exhaust fan 10, the circulating fans 11 and the valve 15. This is accomplished by connecting the terminal 76 of the unit 20 to the contact 77 of the unit 21, connecting the contact 77 of the unit 20 to the contact 100 of the switch 97, connecting the contact 78 of the unit 20 to the terminal 82 of the switch 80, connecting the terminal 76 of the unit 21 to one side of the solenoid of the valve 15, the contact 92 of the switch 86 and to one side of the reversing switch 12, and connecting the contact 78 of the unit 21 to the terminal 95 of the switch 87. Other connections are established by connecting the contact 84 of the switch 80 to the contact 99 and to one side of the motor of the timer 24, the other side of which is connected to the power line $L_2$.

The foregoing network enables the control system to operate in the manner about to be described. When the switches 74 of the units 20 and 21 and the timers are in the position shown and the main switch 90 (FIG. 1C) is closed, the power line $L_1$ is connected through the terminal 89, the arm 88 and the contact 92 to the reversing switch 12 by which the circulating fans are turned on, to the solenoid 15 and to the exhaust fan 10 through the terminal 76, the arm 75 and the contact 77 of the unit 21 and the terminal 76, the arm 75 and the contact 77 of the unit 20 and the contact 100.

When the pressure output of the relay 19 is of a value to operate the unit 20, the exhaust fan 10 is shut off by disengagement of the arm 75 with the contact 77 of unit 20 and the timer 22 is energized by engagement of the arm 75 with the contact 78. When the time for which the timer 22 is set expires, the timer causes the switch arm 81 to disengage the contact 85 and to engage the contact 84, whereby the timer motor and the exhaust fan are shut off and the motor of the timer 24 is energized. During the time for which the timer 24 is set, alternate On and Off control of the exhaust fan is effected through the switch 97.

When the pressure output of the relay 19 reaches a higher value, which is capable of operating the unit 21, the timer 24 is shut off by disengagement of the arm 75 with the contact 77, exhaust fan 10 is shut off because the arm 98 is now out of engagement with the contacts 99 and 100, and the timer 23 is energized by engagement of the arm 75 with the contact 78 through closed switch 87. When time for which the timer 23 is set expires, the timer causes the switches 86 and 87 to open, whereby the circulating fans 11 and the solenoid of the valve 15 are de-energized to stop circulation and to stop the supply of heat to the chamber of the dryer.

In FIG. 3, a directly sensing pressure signal differential control unit 120, 121 is shown which can be used in place of the units 20 and 21, whereby the relay 19 can be dispensed with. This unit comprises a casing 170 partitioned by a diaphragm 171 having a stem 172 thereon for operating a switch 174 including an arm 175 connected to a terminal 176 and to either of contacts 177 and 178. The transmitter pressure signal outputs 49, 50 are connected to the casing 170 at opposite sides of the diaphragm whereby the diaphragm directly senses the pressure differential.

The parts of the units 120, 121 which are equivalent in function to parts of the units 20, 21 are designated by the same numerals with one hundred added thereto. The units 120, 121 can be connected to each other and the timers in the same manner as the units 20, 21 to control the system in the same manner as already described.

Before proceeding with a specific example of drying macaroni, an explanation of the considerations which enter into such a process will be helpful. In macaroni it has been found that the moisture content, that is, pounds of water divided by pounds of bone dry product will always be the same at a given depression between wet and dry bulb temperatures. For example, at a 6° F. depression the moisture content will be 15%. Consequently, if macaroni which has a 10% moisture content is subjected to an atmosphere having a greater humidity, such as an atmosphere with a 6° F. depression reading, the macaroni will pick up moisture until its moisture content will be 15%. Conversely, macaroni having a 20% moisture content can be dried in an atmosphere, which gives a 6° F. depression reading, to a 15% moisture content.

In utilizing the present system to control the drying of macaroni, the moisture content of the air in the room containing the product is brought down rapidly to about 6° F. depression by the stem heated chamber and operation of the exhaust fan 10, and the unit 20 is operated by the signal produced by this 6° F. depression to shut off the exhaust fan and to start the motor of the timer 22. Should the depression go back to a value below 6° F. the timer motor is stopped and the exhaust fan is run again to bring the depression up to 6° F. The moisture content of the air surrounding the product is held at 6° F. depression until the timer 22 runs out, at which time the product will have reached equilibrium with a moisture content of 15%. The timer 24 then starts and effects intermittent operation of the exhaust fan, whereby the moisture content of the air will be gradually decreased and the depression increased. After the moisture content of the air surrounding the product has been lowered slowly to a depression of about 12° F., the unit 21 is operated to start the timer 23. Should the depression decrease to a value below 12° F., the exhaust fan runs again under On and Off control of the timer 24, and this occurs repeatedly until the depression remains at its value of 12° F. and no longer falls below this point. That is, the product is now in equilibrium with the surrounding air at 12° F. depression. The timer 24 and exhaust fan then stop. The timer 23 continues until its expiration time, whereupon the steam line and the circulation fans are shut off. The product has then been dried to have the desired moisture content of about 11.8% without guesswork on the part of the operator.

By drying the product in stages, namely, rapid drying to about 6° F. depression of surrounding air, obtaining equilibrium of the product and the air at this point by intermittent exhaust fan operation, slowly drying to about 12° F. depression and again obtaining equilibrium of the product and the air, a product having a predetermined moisture content which will not check or crack is provided in a minimum of time without manual supervision or control.

From the foregoing description it will be seen that the present invention provides an improved system for controlling the drying of products of the class described.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a system for controlling the atmospheric condition within a drying chamber, the combination of an exhaust fan for the chamber, dry bulb temperature controlled means for converting a temperature signal to a pressure signal, wet bulb temperature controlled means for converting a temperature signal to a pressure signal, switch means for starting and stopping said exhaust fan, means controlled by the difference between the wet and dry bulb pressure signals and operable when the difference in the signals is above a desired value to cause said switch means to stop said exhaust fan and operable when the difference in the signals is below the desired value to cause said switch means to start said exhaust fan, a timer stopped and started by said switch means to limit the total time said fan can be stopped.

2. In a system for controlling the atmospheric condition within a drying chamber, the combination of an exhaust fan for the chamber, dry bulb temperature controlled means for converting a temperature signal to a pressure signal, wet bulb temperature controlled means for converting a temperature signal to a pressure signal, switch means for starting and stopping said exhaust fan, means controlled by the difference between the wet and dry bulb pressure signals and operable when the difference in the signals is above a desired value to cause said switch means to stop said exhaust fan and operable when the difference in the signals is below the desired value to cause said switch means to start said exhaust fan, a timer stopped and started by said switch means to limit the total time said fan can be stopped, and a percentage timer started by said first timer having a switch for starting and stopping said fan.

3. A system according to claim 2, including second switch means for starting and stopping said exhaust fan, and second means controlled by the difference of the wet and dry bulb pressure signals and operable when the difference in the signals is above a desired value which is greater than the first mentioned desired value to cause said second switch means to stop said fan and operable when the difference in the signals is below the last mentioned desired value to cause said second switch means to start said fan.

4. A system according to claim 3, including a second timer stopped and started by said second switch means to limit the total time said exhaust fan can be stopped and started by said second switch means.

5. A system according to claim 4, wherein said second timer has a switch for stopping said exhaust fan when the total time has expired.

6. A system according to claim 4, including fan means for providing circulation in the drying chamber, and wherein said second timer has a switch for stopping said fan means when the total time has expired.

7. A system according to claim 4, including means for supplying heat to the chamber, control means for shutting off the supply of heat, and wherein said second timer has a switch for actuating said control means to shut off the supply of heat when the total time has expired.

8. A system according to claim 3, including means for computing the difference of the pressure signals and producing an output signal, and means for causing said output signal to control said first and second controlled means.

9. A system according to claim 3, wherein said first and second controlled means each includes a casing, diaphragm means partitioning said casing, means on said diaphragm means for operating said switch means, means for causing one side of said diaphragm means to sense the dry bulb pressure signal, and means for causing the other side of said diaphragm means to sense the wet bulb pressure signal.

References Cited in the file of this patent

UNITED STATES PATENTS

| | | |
|---|---|---|
| 1,263,484 | Thompson | Apr. 23, 1918 |
| 1,312,759 | Stacey | Aug. 12, 1919 |
| 2,016,091 | Karlson | Oct. 1, 1935 |
| 2,124,845 | Cobb | July 26, 1938 |
| 2,262,057 | Shaw | Nov. 11, 1941 |
| 2,293,403 | Razek | Aug. 18, 1942 |
| 2,541,219 | Dueringer | Feb. 13, 1951 |
| 2,552,387 | Whinery | May 8, 1951 |
| 2,606,372 | Foulder et al. | Aug. 12, 1952 |
| 2,608,768 | Noel | Sept. 2, 1952 |
| 2,919,492 | Story | Jan. 5, 1960 |
| 3,070,896 | Knudson | Jan. 1, 1963 |